United States Patent [19]

Fiorentino

[11] 4,067,854

[45] Jan. 10, 1978

[54] ADSORPTION PROCESS

[75] Inventor: Elio Fiorentino, West Byfleet, England

[73] Assignee: Rohm and Haas Company, Philadephia, Pa.

[21] Appl. No.: 608,943

[22] Filed: Aug. 29, 1975

[51] Int. Cl.² .............................................. C08G 8/10
[52] U.S. Cl. ................................... 260/57 R; 260/49; 260/59 R; 260/47 EP; 260/47 EQ; 260/67.6 R; 260/69 R; 260/75 R; 260/75 T
[58] Field of Search .............. 260/57 R, 59 R, 67.6 R, 260/69 R, 47 EP, 47 EQ, 75 R, 75 T, 49

[56] References Cited

U.S. PATENT DOCUMENTS

| | | | |
|---|---|---|---|
| 2,228,159 | 1/1941 | Wassenegger et al. | 260/57 |
| 2,861,948 | 11/1958 | McKellar | 260/621 A |
| 2,911,363 | 11/1959 | Kissling | 260/621 A |
| 3,531,465 | 9/1970 | Bridgeford | 536/61 |
| 3,663,467 | 5/1972 | Albright | 526/303 |
| 3,736,292 | 5/1973 | Thayer et al. | 260/57 R |
| 3,937,686 | 2/1976 | Augstkalus | 260/78 R |

OTHER PUBLICATIONS

Chem. Absts., 76 (1972) 101646q, "Fixed–Bed Sorption with Recycle", Cooney et al.
Chem. Abstrs., 79 (1973) 128981u, "Isolation of Phenols from Water", Vinson et al.
Chem. Absts. 76 (1972) 76262b, "Use of Adsorbents for the Purification of Waste Water", Karelin et al.
Chem. Absts., 66 (1967) 40567j, "Purification–Waste Water–Phenol–Ion Exchangers", Krasnov et al.

Primary Examiner—Edward M. Woodberry

[57] ABSTRACT

In a process for reacting two or more reactants, such as phenol and formaldehyde in the manufacture of phenol/formaldehyde resins, the reaction by-products are treated with an adsorbant resin to remove excess reactant therefrom and the reactant so adsorbed is removed from the adsorbent by elution with the other reactant, the eluate being recycled to the reaction.

5 Claims, 1 Drawing Figure

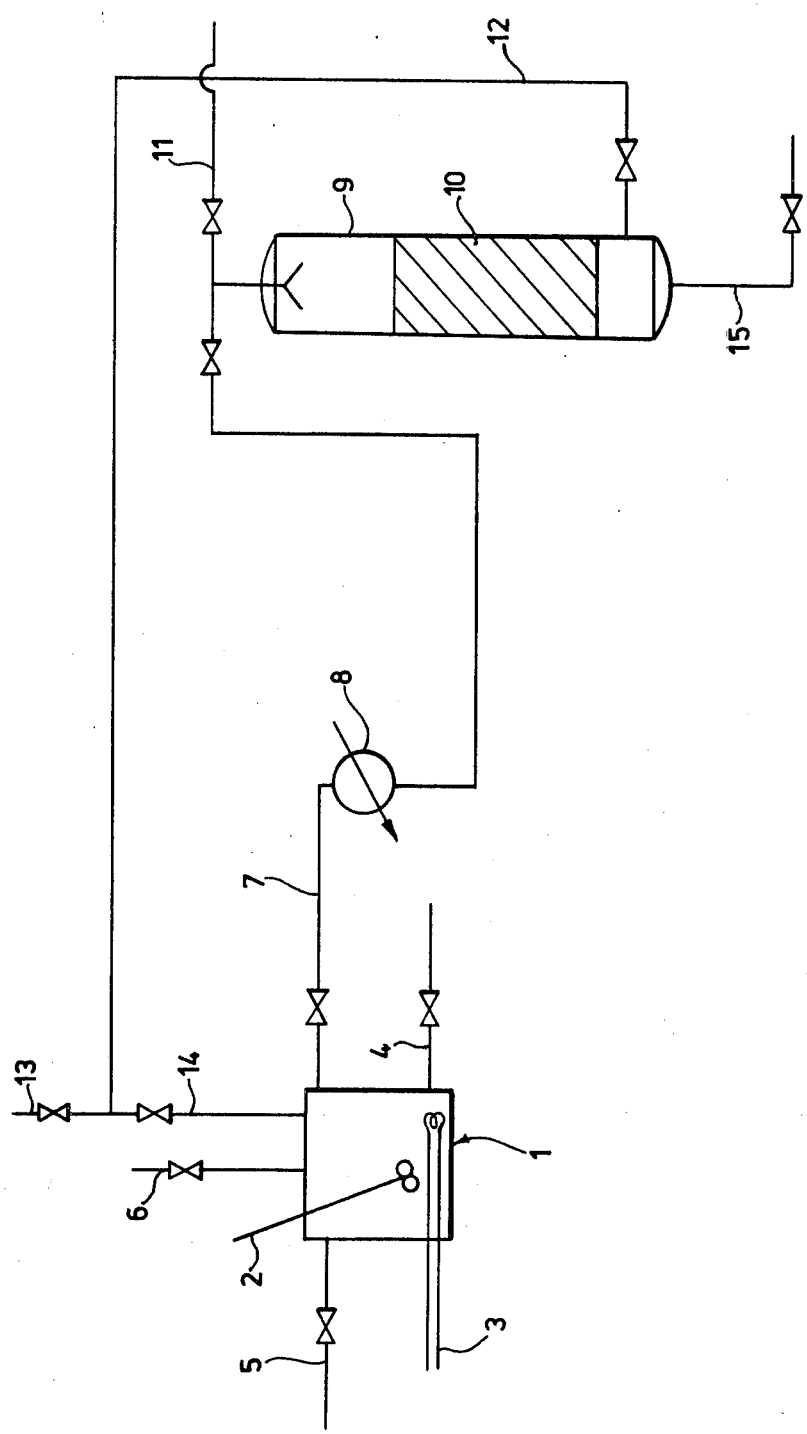

ADSORPTION PROCESS

This invention is concerned with the recovery, by adsorption, of excess reactant from reaction processes.

We have found that in certain reaction processes one reactant can be adsorbed on an adsorbant resin and can be eluted from that resin, without chemical reaction taking place, by another, often the other, reactant. Furthermore we have found certain reaction processes which take advantage of this to enhance the efficiency and environmental acceptability of the basic chemical reaction.

In a process for the reaction of two or more reactants the invention provides the improvement of removing excess reactant from products of the reaction by adsorption on a bed of adsorbant resin, eluting the adsorbed reactant from the resin bed by contact with another reactant and recycling the eluate to the reaction.

The limitations on applicability of this process are that the excess reactant must be preferentially adsorbed, as compared with the remaining reaction products, on the adsorbant resin and the eluant reactant must not react with the adsorbed reactant under the elution conditions. Such conditions are to be found in the following reactions, to which this invention may therefore be applied:

| Reaction | Adsorbed reactant | Eluant reactant |
|---|---|---|
| Polymerisation | Phenol | Formaldehyde |
| " | Urea | Formaldehyde |
| " | Melamine | Formaldehyde |
| " | Bisphenol A | Epichlorohydrin |
| " | Organic Acids | Alcohols |
| " | Organic Acids | Amines |
| Esterification | Organic Acids | Alcohols |
| Amination | Chlorobenzene | Ammonia |
| " | Anthraquinonene-2-sulfonic acid or salts | Ammonia |
| " | Organic Acid | Ammonia |

The products of the reaction which are contacted with the adsorbant to remove the excess reactant may or may not have been previously treated to remove from the immediate reaction product one or more products of the reaction.

All or a part of the reaction requirements of the eluant reactant may be passed in contact with the adsorbant bed as necessary or convenient.

The adsorbant can be any material effective to adsorb the excess reactant from the liquid reaction product stream. Suitable adsorbants include the macroreticular acrylic and/or styrene and/or divinylbenzene resins currently used or recommended in adsorption processes. The resins may be ion exchange resins or they may be devoid of ion exchange functionality. However it must be understood that this invention applies only to adsorption processes and therefore to the use of ion exchange resins as adsorbants and not solely as ion exchangers. Furthermore, no restriction is foreseen on the utility in this invention of adsorbants not yet discovered.

Suitable adsorbants include granular cross-linked polymers prepared by suspension polymerisation of polymerizable ethylenically unsaturated molecules comprising about 2 to 100 weight percent of at least one poly(vinyl) benzene monomer selected from the group consisting of divinylbenzene, trivinylbenzene, alkyldivinylbenzenes having from 1 to 4 alkyl groups of 1 to 2 carbon atoms substituted in the benzene nucleus, and alkyltrivinylbenzenes having 1 to 3 alkyl groups of 1 to 2 carbon atoms substituted in the benzene nucleus. Besides the homopolymers and copolymers of these poly(vinyl)benzene monomers, one or more of them may be copolymerised with up to 98% (by weight of the total monomer mixture) of (1) monoethylenically unsaturated monomers, or (2) polyethylenically unsaturated monomers other than the poly(vinyl)benzenes just defined, or (3) a mixture of (1) and (2).

Examples of the alkyl-substituted di- and trivinylbenzenes are the various vinyltoluenes, the divinylxylenes, divinylethylbenzene, 1,4-divinyl-2,3,5,6-tetramethylbenzene, 1,3,5-trivinyl-2,4,6-trimethylbenzene, 1,4-divinyl-2,3,6-triethylbenzene, 1,2,4-trivinyl-3,5-di-ethylbenzene, 1,3,5-trivinyl-2-methylbenzene.

Examples of other polyethylenically unsaturated compounds include: divinylpyridine, divinylnaphthalenes, diallyl phthalate, ethyleneglycol diacrylate, ethylene glycol dimethacrylate, divinylsulfone, polyvinyl or polyallyl ethers or glycol, of glycerol, of pentaerythritol, of monothio or dithio-derivatives of glycols and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylene diacrylamide, trivinyl naphthalenes and polyvinylanthracenes.

Examples of suitable monoethylenically unsaturated monomers that may be used in making the granular macroreticular resin of the latter type include: methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenol acrylate, ethoxybenzyl acrylate, ethoxycyclohexyl acrylate and the corresponding esters of methacrylic acid, ethylene, propylene, isobutylene, diisobutylene, styrene, vinyltoluene, vinyl chloride, vinyl acetate, vinylidene chloride, acrylonitrile. Polyethylenically unsaturated monomers which ordinarily act as though they have only one such unsaturated group, such as isoprene, butadiene and chloroprene, may be used as part of the monoethylenically unsaturated category.

A preferred proportion of the polyethylenically unsaturated compound of the cross-linking type is in the range of about 8 to 25% by weight of the total monomer mixture from which the resin is prepared. The suspension polymerisation produces the resin in the form of granules or beads having an overall bead size in the range of about 0.1 to about 3 millimeters average diameter.

The accompanying drawing shows, schematically the important integers in one apparatus suitable for the production of phenol/formaldehyde resin using the process of the invention.

In this apparatus there is a reaction vessel 1 equipped with stirrer 2 and heating coil 3. The vessel 1 is provided with a resin product outlet line 4 and catalyst inlet line 5. Phenol inlet is through line 6. The reaction product outlet line is line 7 through condenser 8 to adsorbtion column 9 packed with adsorbant resin 10. Formaldehyde eluant for the resin 10 can be admitted to the column 9 through line 11 and the phenol/formaldehyde eluate can be recycled from column 9 to the vessel 1 through line 12 which joins formaldehyde/methanol make-up line 13 to form formaldehyde/methanol/eluate inlet line 14 to the vessel 1. The waste water/formaldehyde/methanol which is not adsorbed from the reaction products by the resin 10 escapes from column 9 to waste through line 15.

The following example exemplifies the process of the invention as applied to the reaction of phenol and formaldehyde in the production of a phenol/formaldehyde resin in an apparatus as described above.

EXAMPLE

A plant producing 17 tons per day of phenolic resins is using formaldehyde and phenol solutions in water as raw materials. The catalyst is added (through line 5) to the reactants and after the reaction time the water remaining in the reaction is evaporated under vacuum. The phenolic resin product is sent to the further resin handling step (through line 4) and the condensate is a waste effluent with the following characteristics:

| Flow Rate | 20 tons per day |
|---|---|
| Phenol concentration | 3% by weight |
| Formaldehyde concentration | 2% by weight |
| Methanol concentration | 1% by weight |
| Water | balance |
| pH | about 2.5 |

This stream is filtered and passed through an adsorption unit (column 9) containing 2 cubic metres of the synthetic poly(styrene/divinyl-benzene) adsorbent (10) and working 2 cycles per day.

11.8 Cubic metres per day of formaldehyde solution at 41% are used to regenerate the adsorbent (inlet through line 11), removing the whole amount of phenol present in the effluent.

The eluate of the regeneration step is fed (through line 12) into the polymerisation reactor (1) together with phenol (through line 6), the balanced amount of formaldehyde (through line 13) and the catalyst (through line 5). The effluent of the adsorption unit (in line 15) has an average phenol concentration of 20 ppm.

What I claim is:

1. A process for recovery and reuse of an excess reactant from a reaction mixture discharged from a reaction vessel which comprises passing the reaction mixture containing the excess reactant through a bed of adsorbent resin capable of preferentially adsorbing the excess reactant wherein the excess reactant is adsorbed, thereafter eluting the excess reactant from the adsorbent bed with an eluant which will not react with the excess reactant in the bed under the conditions of elution, which eluant is itself a reactant, other than the excess reactant, used to form the reaction mixture, and finally, recycling the eluate to the reaction vessel.

2. A process as claimed in claim 1 in which the eluant is a formaldehyde solution.

3. The process as claimed in claim 1 in which the excess reactant is phenol.

4. A process as claimed in claim 1 wherein the adsorbent resin is a macroreticular resin of acrylic, methacrylic, styrene, or divinylbenzene monomers or mixtures thereof.

5. A process as claimed in claim 4 in which the adsorbent resin is a crosslinked polymer prepared by suspension polymerization of (A) at least one 2 to 100 weight percent of a polymerizable ethylenically unsaturated poly (vinyl) benzene monomer and (B) 0 to 98 weight percent of one or more additional monomers selected from (1) monoethylenically unsaturated monomers and (2) polyethylenically unsaturated monomers other than the monomer of (A) above.

* * * * *